United States Patent
Nishiguchi et al.

(10) Patent No.: US 10,988,560 B2
(45) Date of Patent: Apr. 27, 2021

(54) METHOD FOR PRODUCING CARBOXYL-GROUP-CONTAINING POLYMER COMPOSITION

(71) Applicant: Sumitomo Seika Chemicals Co., Ltd., Hyogo (JP)

(72) Inventors: Satoshi Nishiguchi, Himeji (JP); Ryosuke Murakami, Himeji (JP); Shingo Izawa, Himeji (JP); Miyu Ikeda, Himeji (JP); Rie Nakashima, Himeji (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 35 days.

(21) Appl. No.: 16/088,779

(22) PCT Filed: Mar. 28, 2017

(86) PCT No.: PCT/JP2017/012700
§ 371 (c)(1),
(2) Date: Sep. 26, 2018

(87) PCT Pub. No.: WO2017/170577
PCT Pub. Date: Oct. 5, 2017

(65) Prior Publication Data
US 2019/0077896 A1    Mar. 14, 2019

(30) Foreign Application Priority Data
Mar. 30, 2016   (JP) .............................. JP2016-069037

(51) Int. Cl.
| | |
|---|---|
| C08F 2/08 | (2006.01) |
| C08F 2/30 | (2006.01) |
| C08F 220/06 | (2006.01) |
| C08L 33/02 | (2006.01) |
| C08K 5/103 | (2006.01) |
| C08L 101/02 | (2006.01) |

(52) U.S. Cl.
CPC .............. *C08F 220/06* (2013.01); *C08F 2/08* (2013.01); *C08K 5/103* (2013.01); *C08L 33/02* (2013.01); *C08L 101/025* (2013.01)

(58) Field of Classification Search
CPC ............. C08F 2/08; C08F 2/30; C08F 220/06
See application file for complete search history.

(56) References Cited

U.S. PATENT DOCUMENTS

| | | | | |
|---|---|---|---|---|
| 5,149,750 | A * | 9/1992 | Niessner | A61L 15/60 524/823 |
| 6,869,994 | B1 * | 3/2005 | Fujikake | C08F 220/04 524/111 |
| 2017/0291976 | A1 | 10/2017 | Nishiguchi et al. | |
| 2019/0142727 | A1 | 5/2019 | Izawa et al. | |

FOREIGN PATENT DOCUMENTS

| | | |
|---|---|---|
| EP | 0 317 106 A2 | 5/1989 |
| EP | 0 505 163 A1 | 9/1992 |
| EP | 3 437 631 A1 | 2/2019 |
| JP | S61-223010 A | 10/1986 |
| JP | H07-048554 A | 2/1995 |
| JP | 2000-355614 A | 12/2000 |
| JP | 2003-010631 A | 1/2003 |
| JP | 2004-204093 A | 7/2004 |
| JP | 2011-105833 A | 6/2011 |
| JP | 2012-007010 A | 1/2012 |
| WO | WO 2016/056591 A1 | 4/2016 |
| WO | WO 2016/084624 A1 | 6/2016 |
| WO | WO 2017/170576 A1 | 10/2017 |

OTHER PUBLICATIONS

Machine-generated English-language translation of JP 2012007010A. (Year: 2012).*
Extended European Search Report issued for Counterpart European Patent Application. No. 17775114.6 (dated Oct. 24, 2019).
International Search Report for International Application No. PCT/JP2017/012700, dated Jun. 13, 2017 (in 2 pages).
Third Party Observation filed in PCT/2017/012700 on Jul. 27, 2018 (in 5 pages).

* cited by examiner

*Primary Examiner* — Vu A Nguyen
(74) *Attorney, Agent, or Firm* — Knobbe, Martens, Olson & Bear, LLP

(57) ABSTRACT

There is provided a method for producing a carboxyl group-containing polymer composition that is excellent in all of the following: dispersibility in water or the like immediately after the preparation, storage stability, and the transparency of a neutral viscous solution thereof. A method for producing a carboxyl group-containing polymer composition, the carboxyl group-containing polymer composition comprising a carboxyl group-containing polymer (A) that is a copolymer of monomers comprising an $\alpha,\beta$-unsaturated carboxylic acid (a-1) and a compound (a-2) having at least two ethylenically unsaturated groups per molecule; and a nonionic surfactant (B), the method comprising the step of copolymerizing the monomers, wherein in the step, the nonionic surfactant (B) is added into the system when the polymerization degree of the $\alpha,\beta$-unsaturated carboxylic acid (a-1) has reached 70 to 100%.

1 Claim, No Drawings

METHOD FOR PRODUCING CARBOXYL-GROUP-CONTAINING POLYMER COMPOSITION

TECHNICAL FIELD

The present invention relates to a method for producing a carboxyl group-containing polymer composition.

BACKGROUND ART

Conventionally, carboxyl group-containing polymers are used as, for example, thickeners for cosmetics, moisturizers for cataplasms, emulsifiers, suspension stabilizers, or gel bases for batteries and the like. When these carboxyl group-containing polymers are used for these purposes, they are, for example, added to water or the like to prepare homogeneous dispersions, and then neutralized with alkalis. In general, however, because these carboxyl group-containing polymers are powders, they tend to form masses (lumps) when they are dispersed in water or the like. Once lumps are formed, a gel layer is formed on the lump surface, which slows down the rate of penetration of water into the lumps, which makes it difficult to obtain a homogeneous dispersion.

To prevent the formation of lumps, it is known that in the preparation of a carboxyl group-containing polymer by polymerizing an α,β-unsaturated carboxylic acid and the like, a specific amount of at least one compound of polyhydric alcohol fatty acid ester alkylene oxide adducts and polyhydric alcohol fatty acid esters is added, and the polymerization is carried out to obtain a carboxyl group-containing polymer composition having excellent dispersibility in water (see Patent Literature 1).

CITATION LIST

Patent Literature

Patent Literature 1: JP 2000-355614 A

SUMMARY OF INVENTION

Technical Problem

However, although the carboxyl group-containing polymer composition disclosed in Patent Literature 1 is excellent in dispersibility in water or the like immediately after the preparation and the transparency of a neutral viscous solution thereof, the composition is disadvantageous in that the dispersibility in water or the like deteriorates after storage at room temperature for about a month, for example. That is, the carboxyl group-containing polymer composition disclosed in Patent Literature 1 has room for improvement in terms of storage stability. As used herein, "storage stability" means that "excellent dispersibility is maintained over a long period".

It is a main object of the present invention to provide a method for producing a carboxyl group-containing polymer composition that is excellent in all of the following: dispersibility in water or the like immediately after the preparation, storage stability, and the transparency of a neutral viscous solution thereof.

Solution to Problem

After thorough research to solve the aforementioned problem, the present inventors focused on, for example, the structure of a surfactant contained in a carboxyl group-containing polymer composition. As a result, they found that a carboxyl group-containing polymer composition having excellent storage stability is obtained using a method for producing a carboxyl group-containing polymer composition, the carboxyl group-containing polymer composition comprising a carboxyl group-containing polymer (A) that is a copolymer of monomers comprising an α,β-unsaturated carboxylic acid (a-1) and a compound (a-2) having at least two ethylenically unsaturated groups per molecule; and a nonionic surfactant (B), the method comprising the step of copolymerizing the monomers, wherein in the step, the nonionic surfactant (B) is added into the system when the polymerization degree of the α,β-unsaturated carboxylic acid (a-1) has reached 70 to 100% (that is, when 70 to 100% (on a weight basis) of all the α,β-unsaturated carboxylic acid (a-1) used in the step of copolymerizing the monomers has been copolymerized). Furthermore, the inventors found that the carboxyl group-containing polymer composition obtained using this method also exhibits improved dispersibility when it is dispersed in water or the like immediately after the preparation, without losing the transparency of a neutral viscous solution thereof. The present invention was accomplished by further conducting extensive research, based on this finding.

In summary, the present invention provides aspects of the invention comprising the following features:

Item 1. A method for producing a carboxyl group-containing polymer composition, the carboxyl group-containing polymer composition comprising:

a carboxyl group-containing polymer (A) that is a copolymer of monomers comprising an α,β-unsaturated carboxylic acid (a-1) and a compound (a-2) having at least two ethylenically unsaturated groups per molecule; and a nonionic surfactant (B), the method comprising the step of:

copolymerizing the monomers, wherein in the step, the nonionic surfactant (B) is added into the system when the polymerization degree of the α,β-unsaturated carboxylic acid (a-1) has reached 70 to 100%.

Item 2. The method for producing a carboxyl group-containing polymer composition according to item 1, wherein the amount of the nonionic surfactant (B) to be added is 0.5 to 9 parts by mass per 100 parts by mass of the α,β-unsaturated carboxylic acid (a-1).

Advantageous Effects of Invention

The present invention can provide a method for producing a carboxyl group-containing polymer composition that is excellent in all of the following: dispersibility in water or the like immediately after the preparation, storage stability, and the transparency of a neutral viscous solution thereof.

DESCRIPTION OF EMBODIMENTS

A method for producing a carboxyl group-containing polymer composition of the present invention is a method for producing a carboxyl group-containing polymer composition comprising a carboxyl group-containing polymer (A) that is a copolymer of monomers comprising an α,β-unsaturated carboxylic acid (a-1) and a compound (a-2) having at least two ethylenically unsaturated groups per molecule; and a nonionic surfactant (B), which method comprises the step of copolymerizing the monomers. In the method of the present invention, in the step, the nonionic surfactant (B) is added into the system when the polymerization degree of the α,β-unsaturated carboxylic acid (a-1) has reached 70 to 100%. As long as the nonionic surfactant (B) is added at least when the polymerization degree is 70 to 100%, even if the nonionic surfactant (B) is additionally added when the polymerization degree is 0% or more and less than 70%, a similar effect can be expected. If the component (B) is to be added when the polymerization degree is 0% or more and less than 70%, the amount of the component (B) to be added is, for example, more than 0 part by mass and about 50 parts by mass or less, based on the amount of the component (B) to be added when the polymerization degree is 70 to 100%, taken as 100 parts by mass. The method for producing a carboxyl group-containing polymer composition of the present invention will be hereinafter described in detail. As used herein, "neutral viscous solution" refers to a solution prepared by dispersing the carboxyl group-containing polymer composition in water, and subsequently adjusting the dispersion to a pH of about 7 (pH=6 to 8) by adding a neutralizer such as an alkaline compound.

The method of the present invention comprises the step of copolymerizing the monomers comprising the α,β-unsaturated carboxylic acid (a-1) and the compound (a-2) having at least two ethylenically unsaturated groups per molecule. The carboxyl group-containing polymer (A) is produced by this step. Specifically, at least the α,β-unsaturated carboxylic acid (a-1) and the compound (a-2) having at least two ethylenically unsaturated groups are used as monomers, and monomers including these components are copolymerized to produce the carboxyl group-containing polymer (A). The method of the present invention may include step(s) in addition to the above-described step.

(α,β-Unsaturated Carboxylic Acid)

Examples of the α,β-unsaturated carboxylic acid (a-1) (which may be referred to as the monomer (a-1)) include, but are not particularly limited to, olefinic unsaturated carboxylic acids having 3 to 5 carbon atoms, such as acrylic acid, methacrylic acid, crotonic acid, maleic acid, itaconic acid, and fumaric acid. Among these α,β-unsaturated carboxylic acids (a-1), acrylic acid and methacrylic acid, for example, are suitably used, because they are inexpensive and readily available, and impart high transparency to a neutral viscous solution obtained using the resulting carboxyl group-containing polymer composition. These α,β-unsaturated carboxylic acids may be used alone or in combinations of two or more.

(Compound Having at Least Two Ethylenically Unsaturated Groups)

Examples of the compound (a-2) having at least two ethylenically unsaturated groups (compound (a-2) having two or more ethylenically unsaturated groups) include, but are not particularly limited to, di-substituted or higher acrylic acid esters of polyols; di-substituted or higher methacrylic acid esters of polyols; di-substituted or higher allyl ethers of polyols; diallyl phthalate, triallyl phosphate, allyl methacrylate, tetraallyloxyethane, triallyl cyanurate, divinyl adipate, vinyl crotonate, 1,5-hexadiene, and divinylbenzene. Examples of the above-described polyols include ethylene glycol, propylene glycol, polyoxyethylene glycol, polyoxypropylene glycol, glycerin, polyglycerin, trimethylolpropane, pentaerythritol, saccharose, and sorbitol. Among these compounds having at least two ethylenically unsaturated groups, pentaerythritol triallyl ether, pentaerythritol tetraallyl ether, tetraallyloxyethane, triallyl phosphate, and polyallylsaccharose are suitably used, because they facilitate adjusting the viscosity of a neutral viscous solution obtained using the resulting carboxyl group-containing polymer composition. These compounds (a-2) having at least two ethylenically unsaturated groups may be used alone or in combinations of two or more.

The proportion of the compound (a-2) having at least two ethylenically unsaturated groups is preferably 0.01 to 10 parts by mass, more preferably 0.05 to 10 parts by mass, and still more preferably 0.05 to 3 parts by mass, per 100 parts by mass of the α,β-unsaturated carboxylic acid. When the proportion of the compound (a-2) having at least two ethylenically unsaturated groups is 0.01 part by mass or more, the effect of adjusting the viscosity of a neutral viscous solution obtained using the resulting carboxyl group-containing polymer composition can be favorably demonstrated. Furthermore, when the amount of the compound having at least two ethylenically unsaturated groups used is 10 parts by mass or less, the resulting carboxyl group-containing polymer composition can be favorably prepared as a neutral viscous solution. As used herein, "100 parts by mass of the α,β-unsaturated carboxylic acid" refers to the entire amount of the α,β-unsaturated carboxylic acid (a-1) used in the method of the present invention.

(α,β-Unsaturated Compound)

As a monomer constituting the carboxyl group-containing polymer (A), an α,β-unsaturated compound (a-3), for example, may be used in order to adjust the viscosity of a neutral viscous solution obtained using the resulting carboxyl group-containing polymer composition.

The α,β-unsaturated compound (a-3) is not particularly limited as long as it differs from the α,β-unsaturated carboxylic acid (a-1), and examples include acrylic acid esters such as methyl acrylate, ethyl acrylate, isopropyl acrylate, butyl acrylate, octyl acrylate, 2-ethyl acrylate, decyl acrylate, lauroyl acrylate, stearyl acrylate, and glycidyl acrylate; methacrylic acid esters corresponding to the above-described acrylic acid esters; glycidyl ethers such as vinyl glycidyl ether, isopropenyl glycidyl ether, allyl glycidyl ether, and butenyl glycidyl ether; acrylamides such as acrylamide, N-methylacrylamide, N-ethylacrylamide, and N-t-butylacrylamide; methacrylamides corresponding to the above-described acrylamides; and vinyl esters such as vinyl acetate, vinyl propionate, and vinyl benzoate. Among these α,β-unsaturated compounds (a-3), acrylic acid esters and methacrylic acid esters are suitably used; in particular, acrylic acid esters and methacrylic acid esters having linear or branched alkyl groups with 12 to 40 (particularly 15 to 30) carbon atoms are preferably used, and stearyl methacrylate, eicosanyl methacrylate, behenyl methacrylate, and tetracosanyl methacrylate are more preferably used. These α,β-unsaturated compounds (a-3) may be used alone or in combinations of two or more. As such an acrylic acid ester or methacrylic acid ester, a product such as trade name BLEMMER VMA70 from NOF Corporation, for example, may be used.

The amount of the α,β-unsaturated compound (a-3) to be used is preferably 0.1 to 20 parts by mass, and more preferably 1 to 10 parts by mass, per 100 parts by mass of the α,β-unsaturated carboxylic acid (a-1). When the amount of the α,β-unsaturated compound (a-3) used is 0.1 part by mass or more, the effect of adjusting the viscosity of a neutral viscous solution obtained using the resulting carboxyl group-containing polymer composition can be favorably demonstrated. Furthermore, when the amount of the α,β-unsaturated compound (a-3) used is 20 parts by mass or less, the viscosity of a neutral viscous solution obtained using the resulting carboxyl group-containing polymer composition can be prevented from becoming excessively low.

In the present invention, although the total proportion of the α,β-unsaturated carboxylic acid (a-1), the compound (a-2) having at least two ethylenically unsaturated groups, and the α,β-unsaturated compound (a-3) in the monomers constituting the carboxyl group-containing polymer (A) is not particularly limited, it is, for example, preferably 50% by mass or more, more preferably about 80 to 100% by mass, still more preferably about 90 to 100% by mass, and particularly preferably about 95 to 100% by mass. The total proportion may be substantially 100% by mass. Although the proportion of the α,β-unsaturated carboxylic acid (a-1) in the monomers constituting the carboxyl group-containing polymer (A) is not particularly limited, it is, for example, preferably 95% by mass or more, more preferably about 96 to 99% by mass, and still more preferably about 97 to 98% by mass.

The method for copolymerizing these monomers is not particularly limited, and a known or conventionally used method can be adopted. Specifically, the copolymerization can be carried out using, for example, any of the following methods (1) to (3):

method (1): the α,β-unsaturated carboxylic acid (a-1) and the compound (a-2) having at least two ethylenically unsaturated groups (as well as optionally the α,β-unsaturated compound (a-3)) are allowed to coexist from the beginning of polymerization (for example, the entire amounts of the respective components are allowed to coexist), and the copolymerization is carried out;

method (2): the compound (a-2) having at least two ethylenically unsaturated groups is continuously added to the α,β-unsaturated carboxylic acid (a-1), and the polymerization is carried out simultaneously, wherein when the α,β-unsaturated compound (a-3) is used, the method for subjecting the compound to polymerization is not particularly limited, and, for example, the α,β-unsaturated compound (a-3) may be allowed to coexist with the α,β-unsaturated carboxylic acid (a-1) in advance, or may be continuously added like the compound (a-2) having at least two ethylenically unsaturated groups; and method (3): the α,β-unsaturated carboxylic acid (a-1) and the compound (a-2) having at least two ethylenically unsaturated groups are continuously added, and the polymerization is carried out simultaneously, wherein when the α,β-unsaturated compound (a-3) is used, the method for subjecting the compound to polymerization is not particularly limited, and, for example, the α,β-unsaturated compound (a-3) may be introduced into the polymerization system in advance, or may be continuously added like the α,β-unsaturated carboxylic acid (a-1) and the compound (a-2) having at least two ethylenically unsaturated groups.

By way of example, the method (1) is specifically described. In the method (1), desired amounts of the α,β-unsaturated carboxylic acid (a-1), the compound (a-2) having at least two ethylenically unsaturated groups, a radical polymerization initiator, and an inert solvent are weighed out in advance, and introduced into a reaction vessel equipped with a stirrer, a thermometer, a nitrogen gas inlet tube, and a condenser tube, for example.

Next, the contents in the reaction vessel are mixed with stirring to give a homogeneous composition. Then, nitrogen gas is blown into the contents to remove oxygen gas contained in the upper space of the reaction vessel and dissolved oxygen dissolved in the contents. The polymerization reaction can be performed by heating to 20 to 120° C., preferably 30 to 90° C., in a warm bath, for example. The polymerization reaction is typically completed in 2 to 10 hours.

In the entire amount of the α,β-unsaturated carboxylic acid (a-1), the compound (a-2) having at least two ethylenically unsaturated groups, optionally the α,β-unsaturated compound (a-3), the radical polymerization initiator, and the inert solvent to be introduced, the total amount of the α,β-unsaturated carboxylic acid (a-1) and the compound (a-2) having at least two ethylenically unsaturated groups to be introduced (when the α,β-unsaturated compound (a-3) is used, the total amount of the α,β-unsaturated carboxylic acid (a-1), the compound (a-2) having at least two ethylenically unsaturated groups, and the α,β-unsaturated compound (a-3) to be introduced) is 1% by mass or more, and preferably 5% by mass or more, in order to increase the volume efficiency and improve productivity, and is 30% by mass or less, and preferably 25% by mass or less, in order to allow the reaction to proceed smoothly, while avoiding an increase in the viscosity of the slurry due to significant precipitation of the polymer along with the progress of the polymerization reaction. The total amount to be introduced is preferably 1 to 30% by mass, and more preferably 5 to 25% by mass.

The inert solvent is not particularly limited as long as it is a solvent that dissolves the α,β-unsaturated carboxylic acid (a-1), the compound (a-2) having at least two ethylenically unsaturated groups, and the α,β-unsaturated compound (a-3), but does not dissolve the carboxyl group-containing polymer composition produced. Preferred specific examples of the inert solvent include optionally halogen-substituted aliphatic hydrocarbons having 2 to 8 carbon atoms, such as ethylene dichloride, normal pentane, normal hexane, isohexane, normal heptane, normal octane, and isooctane; alicyclic hydrocarbons having 5 to 7 carbon atoms, such as cyclopentane, methylcyclopentane, cyclohexane, and methylcyclohexane; optionally halogen-substituted aromatic hydrocarbons, such as benzene, toluene, xylene, and chlorobenzene; acetic acid alkyl esters such as ethyl acetate and isopropyl acetate; and ketone-based compounds such as methyl ethyl ketone and methyl isobutyl ketone. These inert solvents may be used alone or in combinations of two or more. Among these inert solvents, ethylene dichloride, normal hexane, cyclohexane, normal heptane, and ethyl acetate are preferred because they are stable in quality and readily available.

The radical polymerization initiator is not particularly limited in type. Specific examples of the radical polymerization initiator include α,α'-azoisobutyronitrile, 2,2'-azobis-2,4-dimethylvaleronitrile, dimethyl-2,2'-azobisisobutylate, benzoyl peroxide, lauroyl peroxide, cumene hydroperoxide, and tert-butyl hydroperoxide. These radical polymerization initiators may be used alone or in combinations of two or more.

The amount of the radical polymerization initiator cannot be unequivocally determined since it varies depending on the type, reaction temperature, and the like. Typically, however, the amount of the radical polymerization initiator is preferably 0.1% by mass or more, and more preferably 0.3% by mass or more, based on the total amount of the α,β-unsaturated carboxylic acid (a-1), the compound (a-2) having at least two ethylenically unsaturated groups, and the α,β-unsaturated compound (a-3) that are used as monomers of the carboxyl group-containing polymer (A), in order to increase the rate of the polymerization reaction, and is preferably 10% by mass or less, and more preferably 3% by mass or less, in order to facilitate removal of heat during the polymerization reaction. The amount of the radical polymerization initiator is preferably 0.1 to 10% by mass, and more preferably 0.3 to 3% by mass.

It is preferred to remove oxygen from the reaction system in advance, because the presence of oxygen during the reaction adversely affects the reaction. Thus, the atmosphere during the reaction is preferably an inert gas atmosphere such as nitrogen gas or argon gas, for example, in order to avoid the influence of oxygen.

In the method of the present invention, in the step of copolymerizing the monomers, the nonionic surfactant (B) is added into the system when the polymerization degree of the α,β-unsaturated carboxylic acid (a-1) has reached 70 to 100%. That is, the nonionic surfactant (B) is added into the system either when the copolymerization of the α,β-unsaturated carboxylic acid (a-1) has not yet completed (the polymerization degree is 70% or more and less than 100%), or has completed (the polymerization degree is 100%). In the method of the present invention, because the nonionic surfactant (B) is added at the specific timing, a carboxyl group-containing polymer composition can be produced that is excellent in all of the following: dispersibility in water or the like immediately after the preparation, storage stability, and the transparency of a neutral viscous solution thereof. As long as the nonionic surfactant (B) is added at least when the polymerization degree is 70% or more, a similar effect is achieved even if the nonionic surfactant (B) is separately added when the polymerization degree is less than 70%.

In the method of the present invention, the polymerization degree in the copolymerization step can be confirmed using the method described in the Examples.

(Nonionic Surfactant)

The nonionic surfactant (B) is composed of a hydrophilic moiety and a hydrophobic moiety. Examples of the hydrophobic moiety include a polyhydric alcohol fatty acid ester and an addition polymer of a hydroxy fatty acid.

Suitable examples of the polyhydric alcohol moiety of the polyhydric alcohol fatty acid ester include glycerin, polyglycerin, trimethylpropanol, sorbitol, and sorbitan. The polyhydric alcohol residue of the nonionic surfactant (B) is preferably one derived from any of these polyhydric alcohols. These polyhydric alcohol moieties may be present alone or in combinations of two or more.

Suitable examples of the fatty acid moiety of the polyhydric alcohol fatty acid ester include stearic acid, isostearic acid, and palmitic acid. That is, the fatty acid residue of the nonionic surfactant (B) is preferably one derived from any of these fatty acids. These fatty acid moieties may be present alone or in combinations of two or more.

Examples of the polyhydric alcohol fatty acid ester in the hydrophobic moiety of the nonionic surfactant (B) include stearic acid esters, isostearic acid esters, palmitic acid esters, and hydrogenated castor oil derivatives.

Suitable examples of the addition polymer of the hydroxy fatty acid in the hydrophobic moiety of the nonionic surfactant (B) include addition polymers of 2-hydroxypalmitic acid, 16-hydroxypalmitic acid, and 12-hydroxystearic acid.

Examples of the hydrophilic moiety of the nonionic surfactant (B) include carboxy, hydroxy, amino, sulfonyl, and ether groups. The ether group in the hydrophilic moiety of the nonionic surfactant (B) may be an oxyalkylene chain such as polyoxyalkylene.

Suitable examples of the oxyalkylene chain in the nonionic surfactant (B) include an oxyalkylene group represented by the formula:

   Formula:

wherein $R^1$ represents a hydrogen atom, a methyl group, or an ethyl group; n represents an integer from 1 to 100; and where n is an integer of 2 or more, a plurality of $R^1$s may each be the same or different.

The nonionic surfactant (B) is preferably a polyhydric alcohol fatty acid ester alkylene oxide adduct, for example. The polyhydric alcohol fatty acid ester alkylene oxide adduct is an alkylene oxide adduct of a fatty acid ester of a polyhydric alcohol. The polyhydric alcohol fatty acid ester alkylene oxide adduct serves as an emulsifier.

Suitable examples of the polyhydric alcohol moiety of the polyhydric alcohol fatty acid ester alkylene oxide adduct include glycerin, polyglycerin, trimethylpropanol, sorbitol, and sorbitan, as mentioned above. That is, the polyhydric alcohol residue of the polyhydric alcohol fatty acid ester alkylene oxide adduct is preferably one derived from any of these polyhydric alcohols. These polyhydric alcohol moieties may be present alone or in combinations of two or more.

Suitable examples of the fatty acid moiety of the polyhydric alcohol fatty acid ester alkylene oxide adduct include stearic acid, isostearic acid, and palmitic acid, as mentioned above. That is, the fatty acid residue of the polyhydric alcohol fatty acid ester alkylene oxide adduct is preferably one derived from any of these fatty acids. These fatty acid moieties may be present alone or in combinations of two or more.

As mentioned above, examples of the polyhydric alcohol fatty acid ester of the polyhydric alcohol fatty acid ester alkylene oxide adduct include stearic acid esters, isostearic acid esters, palmitic acid esters, and hydrogenated castor oil derivatives.

Suitable examples of the oxyalkylene chain in the polyhydric alcohol fatty acid ester alkylene oxide adduct include the oxyalkylene group represented by the general formula (1) shown above.

The nonionic surfactant (B) preferably has an HLB of 5 to 8.

Preferred specific examples of the nonionic surfactant (B) include polyoxyethylene glyceryl triisostearate, polyoxyethylene (30) hydrogenated castor oil triisostearate, polyoxyethylene hydrogenated castor oil derivatives, polyoxyethylene glycerin fatty acid esters, and polyoxyethylene trimethylol tristearate. Specific examples of polyoxyethylene glycerin fatty acid esters include polyoxyethylene glyceryl monostearate, polyoxyethylene glyceryl distearate, polyoxyethylene glyceryl tristearate, polyoxyethylene glyceryl isostearate, polyoxyethylene glyceryl diisostearate, polyoxyethylene glyceryl triisostearate, a block copolymer of 2-hydroxypalmitic acid and alkylene glycol, a block copolymer of 16-hydroxypalmitic acid and alkylene glycol, and a block copolymer of 12-hydroxystearic acid and alkylene glycol.

When a hydrogenated castor oil derivative is used as the polyhydric alcohol fatty acid ester, preferred specific examples of the polyhydric alcohol fatty acid ester alkylene oxide adduct include polyoxyethylene hydrogenated castor oil, polyoxyethylene hydrogenated castor oil laurate, polyoxyethylene hydrogenated castor oil isostearate, and polyoxyethylene hydrogenated castor oil triisostearate.

Among the polyhydric alcohol fatty acid ester alkylene oxide adducts, polyoxyethylene hydrogenated castor oil, polyoxyethylene hydrogenated castor oil isostearate, polyoxyethylene hydrogenated castor oil triisostearate, and polyoxyethylene sorbitol tetraoleate are preferred, because these polyhydric alcohol fatty acid ester alkylene oxide adducts even when used in small amounts can give a carboxyl group-containing polymer composition having excellent dispersibility, and can impart a thickening effect while the high transparency of a neutral viscous solution of the composition is maintained.

In order to improve the dispersibility of the resulting carboxyl group-containing polymer composition in water, the amount of the nonionic surfactant (B) to be added (i.e., the amount of the nonionic surfactant (B) to be added when the polymerization degree is 70% or more and 100% or less) is preferably 0.5 part by mass or more, and more preferably 3 parts by mass or more, per 100 parts by mass of the carboxyl group-containing polymer (A). Furthermore, in order to prevent an excessive increase in the viscosity of a neutral viscous solution of the resulting carboxyl group-containing polymer composition, the amount of the nonionic surfactant (B) to be added is preferably 9 parts by mass or less, and more preferably 7 parts by mass or less, per 100 parts by mass of the carboxyl group-containing polymer (A). That is, the amount of the nonionic surfactant (B) to be added is preferably about 0.5 to 9 parts by mass, and more preferably 3 to 7 parts by mass.

The method for producing a carboxyl group-containing polymer composition of the present invention can be carried out in accordance with, for example, the following methods (1A) and (2A):

Method (1A): the $\alpha,\beta$-unsaturated carboxylic acid (a-1) and the compound (a-2) having at least two ethylenically unsaturated groups (as well as optionally the $\alpha,\beta$-unsaturated compound (a-3)) are introduced into a reaction vessel in advance, these monomers are copolymerized, and when the polymerization degree has reached 70 to 100%, the nonionic surfactant (B) is added into the slurry in the system.

Method (2A): the $\alpha,\beta$-unsaturated carboxylic acid (a-1) and the compound (a-2) having at least two ethylenically unsaturated groups are each continuously added into a reaction vessel, and the copolymerization is carried out simultaneously, and when the polymerization degree has reached 70 to 100%, the nonionic surfactant (B) is added into the slurry in the system, wherein when the $\alpha,\beta$-unsaturated compound (a-3) is used in the method (2A), the method for subjecting the compound to polymerization is not particularly limited, and, for example, the $\alpha,\beta$-unsaturated compound (a-3) may be introduced into the reaction vessel in advance, or may be continuously added into the reaction vessel like the $\alpha,\beta$-unsaturated carboxylic acid (a-1) and the compound (a-2) having at least two ethylenically unsaturated groups.

For example, in the method (1A), desired amounts of the $\alpha,\beta$-unsaturated carboxylic acid (a-1), the compound (a-2) having at least two ethylenically unsaturated groups, optionally the $\alpha,\beta$-unsaturated compound (a-3), a radical polymerization initiator, and an inert solvent are weighed out in advance, and introduced into a reaction vessel equipped with a stirrer, a thermometer, a nitrogen gas inlet tube, and a condenser tube. The contents in the reaction vessel are mixed with stirring to give a homogeneous composition, and then nitrogen gas is blown into the contents to remove oxygen gas contained in the upper space of the reaction vessel and dissolved oxygen dissolved in the contents. The polymerization reaction can be performed by heating to 20 to 120° C., preferably 30 to 90° C., in a warm bath, for example. The polymerization reaction is typically completed in 2 to 10 hours. Next, after the polymerization degree is confirmed to have reached 70 to 100%, the nonionic surfactant (B) is diluted with an inert solvent and added into the slurry in the system, and the mixture is stirred to homogeneity. Thereafter, the inert solvent is distilled off from the reaction solution by heating under reduced pressure or normal pressure. In this manner, a carboxyl group-containing polymer composition can be obtained as a white fine powder.

A carboxyl group-containing polymer composition can thus be obtained. The carboxyl group-containing polymer composition produced using the method of the present invention is excellent in all of the following: dispersibility in water or the like immediately after the preparation, storage stability, and the transparency of a neutral viscous solution thereof. Furthermore, a neutral viscous solution can be obtained by, for example, dispersing the carboxyl group-containing polymer composition in water, and subsequently adjusting the pH of the aqueous solution to about 7 (pH=6 to 8) by adding an alkaline component such as sodium hydroxide or triethanolamine. This neutral viscous solution has improved thickening properties, as compared to a neutral viscous solution prepared using a conventional cross-linked carboxyl group-containing polymer.

Furthermore, there has recently been an increasing demand for carboxyl group-containing polymer compositions as thickeners for antimicrobial alcohol gels. However, when an alcohol gel is prepared using, for example, the carboxyl group-containing polymer composition disclosed in Patent Literature 1 described above, the alcohol gel may suffer from a poor viscosity or reduced transparency due to turbidity. As used herein, "alcohol gel" refers to "a gel obtained by dissolving the carboxyl group-containing polymer composition in an aqueous solution containing a total of 54 to 94% by weight of one or more alcohol components, and neutralizing the solution".

As opposed to the above, when a carboxyl group-containing polymer composition is produced by adding the nonionic surfactant (B) into the system when the polymerization degree of the $\alpha,\beta$-unsaturated carboxylic acid (a-1) has reached 70 to 80%, for example, in the step of copolymerizing the monomers in the method for producing a carboxyl group-containing polymer composition of the present invention, the resulting carboxyl group-containing polymer composition exhibits excellent dispersibility in water or the like, and a neutral viscous solution or an alcohol gel having excellent viscosity and transparency can be obtained using the composition.

EXAMPLES

The present invention will be hereinafter described in detail by way of examples and comparative examples, although the present invention is not limited to the examples.

[Evaluation Methods]

Carboxyl group-containing polymer compositions obtained in examples and comparative examples were measured and evaluated using the following methods.

(1) Dispersibility

In a 200 mL (milliliter) volume beaker, 100 g of ion exchange water is placed, and the temperature of the ion exchange water is adjusted to 25° C. Into this beaker, 3.0 g of a carboxyl group-containing polymer composition is added all at once under non-stirring conditions, and the swollen state of the carboxyl group-containing polymer composition is visually observed to measure the time (min) required until the carboxyl group-containing polymer composition becomes completely wet without any dry portions (this time is referred to as the "dispersion time"). When the time required for swelling is 30 minutes or shorter, the dispersibility can be determined to be excellent.

(2) Stability of Dispersibility (Storage Stability)

The ratio of the dispersion time measured using the above-described method (1) 30 days after the production of a carboxyl group-containing polymer composition (referred to as the "dispersion time 2") relative to the dispersion time measured using the above-described method (1) within 24 hours after the production of the composition (referred to as the "dispersion time 1") [=dispersion time 2/dispersion time 1] is used as an index of storage stability (stability of dispersibility: property of maintaining good dispersibility after passage of time). The storage stability improves as the ratio becomes closer to 1; when the ratio is 0.8 to 1.2, the storage stability can be determined to be good.

(3) Polymerization Degree

The polymerization degree is calculated based on the expression shown below. The amount of unreacted monomer (a-1) refers to the total amount of the monomer (a-1) that has not been added into the system at that time and the monomer (a-1) that is present in an unreacted state in the system, out of the entire amount of the monomer (a-1) used in the polymerization reaction. In the expression, each amount of the monomer (a-1) is based on the weight. The amount of unreacted monomer (a-1) is measured by liquid chromatography, for example, high performance liquid chromatography.

[Expression 1]

$$\text{Polymerization Degree [\%] of Monomer }(a\text{-}1) = \frac{\text{Entire Amount of Monomer }(a\text{-}1)\text{ Used in Polymerization Reaction} - \text{Amount of Unreacted Monomer }(a\text{-}1)}{\text{Entire Amount of Monomer }(a\text{-}1)\text{ Used in Polymerization Reaction}} \times 100$$

(4) Viscosity and Transparency of Alcohol Gel

In a 200 mL (milliliter) volume beaker, 51.7 g of ion exchange water and 96.0 g of ethanol are placed, and 0.75 g of a carboxyl group-containing polymer composition is added with stirring. After the components are homogeneously dispersed, stirring is stopped, an ethanol solution (50% by weight) of triethanolamine is added to give a pH of 6 to 8, and the gel is stirred to homogeneity with a hand mixer or the like. The gel is immersed in a thermostat at 25° C., and then the viscosity and transparency of the gel are measured. The viscosity is measured using a Brookfield viscometer (model number: DV1MRVTJ0) at 20 rpm with spindle No. 5. When the viscosity is 5000 mPa·s or more, the viscosity can be determined to be high. As for the transparency, the transmittance of light at a wavelength of 425 nm is measured using a Shimadzu spectrophotometer (model number: UV-3150). When the light transmittance is 95% or more, the transparency can be determined to be high.

Example 1

Into a 500 mL (milliliter) volume four-necked flask equipped with a stirrer, a thermometer, a nitrogen inlet tube, and a condenser tube were introduced 40 g of acrylic acid; 0.88 g of BLEMMER VMA70 (NOF Corporation; a mixture containing 10 to 20 parts by mass of stearyl methacrylate, 10 to 20 parts by mass of behenyl methacrylate, 59 to 80 parts by mass of eicosanyl methacrylate, and 1% by mass or less of tetracosanyl methacrylate) as a (meth)acrylic acid alkyl ester in which the alkyl group has 18 to 24 carbon atoms; 0.20 g of pentaerythritol tetraallyl ether as the compound (a-2) having at least two ethylenically unsaturated groups; 0.116 g of 2,2'-azobis(methyl isobutyrate) as a radical polymerization initiator; and 230.9 g of normal hexane as a reaction solvent. Then, while the contents were being stirred, nitrogen gas was blown into the solution to remove oxygen in the flask. Then, while stirring and blowing of nitrogen gas were being continued, the flask was placed in an oil bath set at 60 to 65° C., and the contents of the flask were heated for 3 hours. The flask was then kept at 60 to 65° C. for 3 hours. Immediately after heating was completed, a solution of 2.0 g of polyoxyethylene (3) castor oil (NIKKOL CO3 from Nikko Chemicals Co., Ltd.) as the nonionic surfactant (B) (emulsifier) in 2.0 g of normal hexane was added into the flask, and stirring of the contents of the flask was further continued for 1 hour. Then, the temperature of the oil bath was set to 100° C., and the contents of the flask were heated to remove the normal hexane in the flask. Then, the contents of the flask were transferred into a vacuum dryer (Vacuum Drying Oven DP33 from Yamato Scientific Co., Ltd.), the temperature of the oven was set to 115° C. and the pressure of the oven was set to 10 mmHg, and the contents were dried for 8 hours to obtain 38 g of a carboxyl group-containing polymer composition as a white powder. As shown in Table 1, the polymerization degree at the time when polyoxyethylene (3) castor oil was added was 98%.

Example 2

Following the procedure of Example 1, except for changing the timing of adding polyoxyethylene (3) castor oil to the time when the polymerization degree was 70% (the time when the flask had been kept at 60 to 65° C. for about 2 hours), 38 g of a carboxyl group-containing polymer composition was obtained as a white powder.

Example 3

Following the procedure of Example 1, except for replacing polyoxyethylene (3) castor oil with polyoxyethylene (30) hydrogenated castor oil triisostearate (EMALEX RWIS-350 from Nihon Emulsion Co., Ltd.), 38 g of a carboxyl group-containing polymer composition was obtained as a white powder.

Example 4

Following the procedure of Example 1, except for not using BLEMMER VMA-70, 38 g of a carboxyl group-containing polymer composition was obtained as a white powder.

Example 5

Following the procedure of Example 1, except for further adding a solution of 0.4 g of polyoxyethylene (3) castor oil (NIKKOL CO3 from Nikko Chemicals Co., Ltd.) as the nonionic surfactant (B) (emulsifier) in 0.4 g of normal hexane at the time when the polymerization degree was 50% (the time when the flask had been kept at 60 to 65° C. for about 1 hour), in addition to the time when the polymerization degree was 98% (after the completion of heating), 38 g of a carboxyl group-containing polymer composition was obtained as a white powder.

Comparative Example 1

Following the procedure of Example 1, except for changing the timing of adding polyoxyethylene (3) castor oil to the time when the polymerization degree was 50% (the time when the flask had been kept at 60 to 65° C. for about 1 hour), 38 g of a carboxyl group-containing polymer composition was obtained as a white powder.

Comparative Example 2

Following the procedure of Example 1, except for changing the timing of adding polyoxyethylene (3) castor oil to the time before polymerization (the time when the polymerization degree was 0%), 38 g of a carboxyl group-containing polymer composition was obtained as a white powder.

[Evaluation Results]

The carboxyl group-containing polymer compositions obtained in the manners described in Examples 1 to 4, and Comparative Examples 1 and 2 were measured and evaluated using the above-described methods. The results are shown in Table 1.

solvent. Then, while the contents were being stirred, nitrogen gas was blown into the solution to remove oxygen in the flask. Then, while stirring and blowing of nitrogen gas were being continued, the flask was placed in an oil bath set at 60 to 65° C., and the contents of the flask were heated for 3 hours. The flask was then kept at 60 to 65° C. for 1 hour (polymerization degree: 75%), and a solution of 2.0 g of a block copolymer of 12-hydroxystearic acid and polyoxyethylene (Hypermer B246 from Croda) as the nonionic surfactant (B) (emulsifier) in 2.0 g of normal hexane was added into the flask. The flask was further kept at 60 to 65° C. for 2 hours to complete the reaction. Then, the temperature of the oil bath was set to 100° C., and the contents of the flask were heated to remove the normal hexane in the flask. Then, the contents of the flask were transferred into a vacuum dryer (Vacuum Drying Oven DP33 from Yamato Scientific Co., Ltd.), the temperature of the oven was set to 115° C. and the pressure of the oven was set to 10 mmHg, and the

TABLE 1

| | | Emulsifier | | | |
|---|---|---|---|---|---|
| | | Trade Name | Polymerization Degree at the Time of Addition | Dispersion Time (min) | Stability of Dispersion |
| Examples | 1 | Polyoxyethylene (3) Castor Oil | 98% | 10 | 1 |
| | 2 | Polyoxyethylene (3) Castor Oil | 70% | 10 | 1.1 |
| | 3 | Polyoxyethylene (30) Hydrogenated Castor Oil Triisostearate | 98% | 11 | 1 |
| | 4 | Polyoxyethylene (3) Castor Oil | 98% | 13 | 1 |
| | 5 | Polyoxyethylene (3) Castor Oil | 50% 98% | 10 | 1 |
| Comparative Examples | 1 | Polyoxyethylene (3) Castor Oil | 50% | 10 | 2 |
| | 2 | Polyoxyethylene (3) Castor Oil | 0% | 11 | 2.5 |

The foregoing results show that the carboxyl group-containing polymer compositions obtained by adding the nonionic surfactant when the polymerization degree of the α,β-unsaturated carboxylic acid (a-1) was 70 to 100% had good storage stability (stability of dispersibility).

Example 6

Into a 500 mL (milliliter) volume four-necked flask equipped with a stirrer, a thermometer, a nitrogen inlet tube, and a condenser tube were introduced 40 g of acrylic acid; 0.88 g of BLEMMER VMA70 (NOF Corporation; a mixture containing 10 to 20 parts by mass of stearyl methacrylate, 10 to 20 parts by mass of eicosanyl methacrylate, 59 to 80 parts by mass of behenyl methacrylate, and 1% by mass or less of tetracosanyl methacrylate) as a (meth)acrylic acid alkyl ester in which the alkyl group has 18 to 24 carbon atoms; 0.20 g of pentaerythritol tetraallyl ether as the compound (a-2) having at least two ethylenically unsaturated groups; 0.116 g of 2,2'-azobis(methyl isobutyrate) as a radical polymerization initiator; and 230.9 g of normal hexane as a reaction contents were dried for 8 hours to obtain 38 g of a carboxyl group-containing polymer composition as a white powder.

Comparative Example 3

Following the procedure of Example 6, except for changing the timing of adding the nonionic surfactant (B) to the time when the polymerization degree was 0% (the time when the monomers and the like were introduced), 38 g of a carboxyl group-containing polymer composition was obtained as a white powder.

[Evaluation Results]

For the carboxyl group-containing polymer compositions obtained in the manners described in Example 6 and Comparative Example 3, the viscosities of alcohol gels were measured, and the transparency of the alcohol gels was also evaluated, using the above-described methods. The results are shown in Table 2.

TABLE 2

| | Emulsifier | | | Dispersion | Alcohol Gel | Alcohol Gel |
|---|---|---|---|---|---|---|
| | Type | HLB Value | Polymerization Degree at the Time of Addition | Time (min) | Viscosity (mPa · s) | Transmittance (%) |
| Example 6 | Block Copolymer of 12-Hydroxystearic Acid and Ethylene Oxide | 6 | 75% | 11 | 11000 | 95 |
| Comparative Example 3 | Block Copolymer of 12-Hydroxystearic Acid and Ethylene Oxide | 6 | 0% | 12 | 3000 | 96 |

The foregoing results show that the carboxyl group-containing polymer composition of Example 6 obtained by adding the nonionic surfactant at the time when the polymerization degree of the α,β-unsaturated carboxylic acid (a-1) was 75% had a higher viscosity and higher transparency when it was prepared as an alcohol gel.

The invention claimed is:

1. A method for producing a carboxyl group-containing polymer composition, the carboxyl group-containing polymer composition comprising:
   a carboxyl group-containing polymer that is a copolymer of monomers comprising an α,β-unsaturated carboxylic acid and a compound having at least two ethylenically unsaturated groups per molecule; and
   a nonionic surfactant,
wherein the method comprises copolymerizing the monomers in an inert solvent in a polymerization reaction, wherein the nonionic surfactant is added into the polymerization reaction only when a polymerization degree of the α,β-unsaturated carboxylic acid has reached 70 to 98%, and an amount of the nonionic surfactant added is 3 to 7 parts by mass per 100 parts by mass of the α,β-unsaturated carboxylic acid.

* * * * *